A. V. RASMUSSEN.
ENGINE.
APPLICATION FILED NOV. 18, 1916.
1,243,554.
Patented Oct. 16, 1917.
2 SHEETS—SHEET 1.
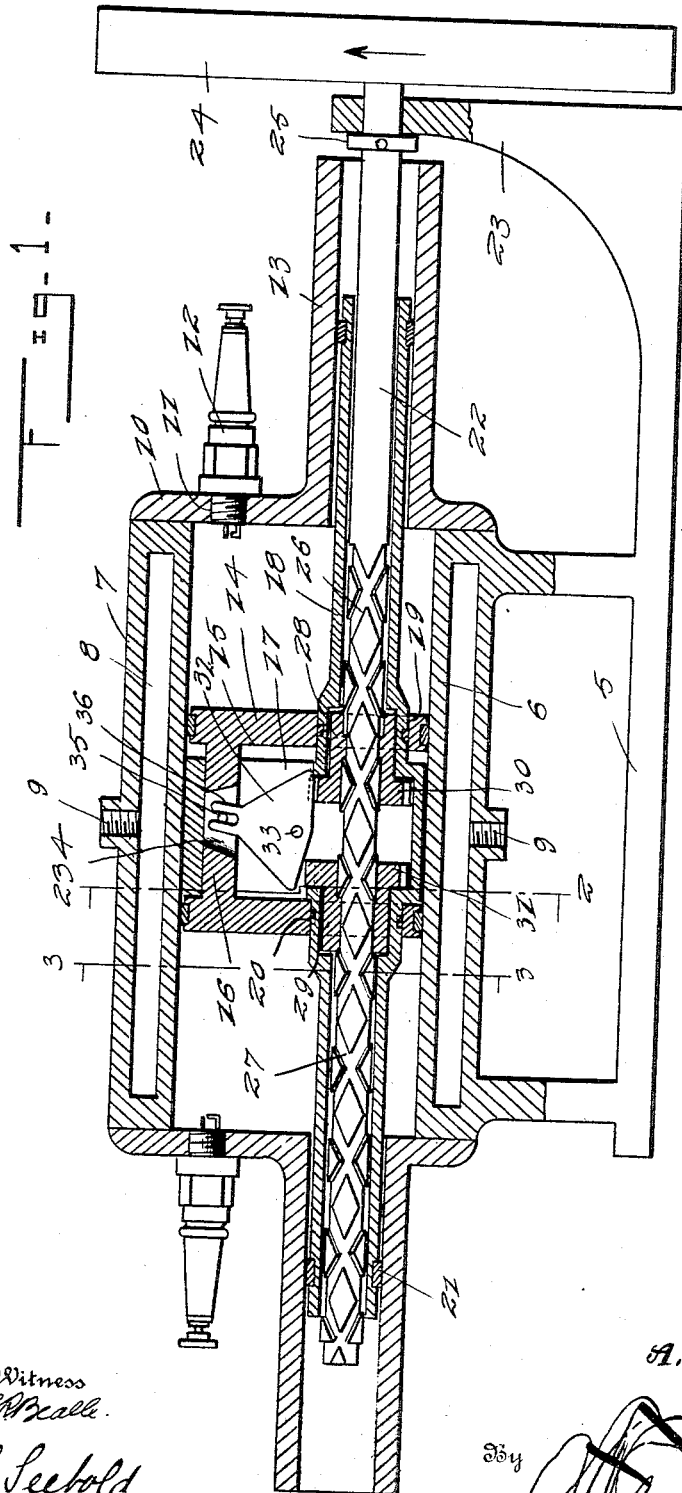
Witness
CRBeall.
C. Seebold
Inventor
A.V. Rasmussen
By
Attorney A. V. RASMUSSEN.
ENGINE.
APPLICATION FILED NOV. 18, 1916.
1,243,554.
Patented Oct. 16, 1917.
2 SHEETS—SHEET 2.
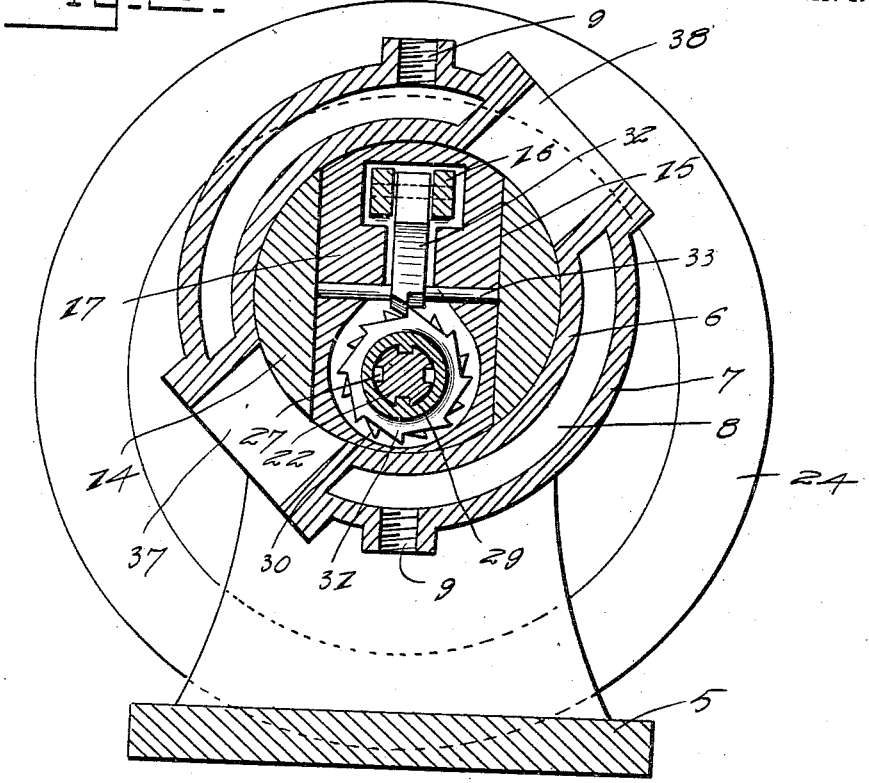
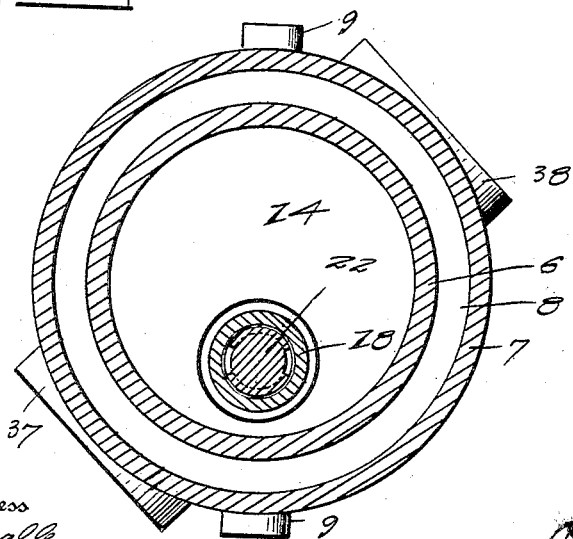
Inventor
A. V. Rasmussen,

UNITED STATES PATENT OFFICE.

AXEL V. RASMUSSEN, OF DETROIT, MICHIGAN.

ENGINE.

1,243,554.  Specification of Letters Patent.  Patented Oct. 16, 1917.

Application filed November 18, 1916.  Serial No. 132,030.

*To all whom it may concern:*

Be it known that I, AXEL V. RASMUSSEN, a subject of the King of Denmark, residing at Detroit, in the county of Wayne and State of Michigan, have invented certain new and useful Improvements in Engines; and I do hereby declare the following to be a full, clear, and exact description of the invention, such as will enable others skilled in the art to which it appertains to make and use the same.

This invention relates to improvements in engines of the reciprocating piston type, and has for its primary object to provide an improved means for transmitting the movement of the piston to the engine shaft and for converting the reciprocatory movement of the piston into a rotary movement with the least possible amount of friction.

With this and other objects in view, the invention consists in the novel construction, combination and arrangement of parts as will be hereinafter specifically described, claimed and illustrated in the accompanying drawings, in which:

Figure 1 represents a longitudinal sectional view through the engine,

Fig. 2 represents a transverse sectional view therethrough, and

Fig. 3 represents a transverse sectional view on the line 3—3 of Fig. 1.

Referring to the drawings in detail, wherein similar reference numerals designate corresponding parts throughout the several views, the numeral 5 indicates a base supporting a cylinder 6, having the outer jacket 7 providing a water chamber 8 communicating with the inlet and outlet ports 9, whereby water is circulated about the cylinder during the operation of the engine. The heads 10 of the cylinders are provided with apertures 11 receiving preferred types of spark plugs 12, and are also provided with eccentrically disposed tubular extensions 13, which are alined with each other and communicate with the cylinders.

The piston 14 is reciprocably mounted within the cylinder and is formed with a diametrical recess 15, the end walls of which are connected with a centrally located bar or web 16.

An enlargement 17 which constitutes a housing, which will hereinafter be more fully described, formed centrally of a tubular member 18, is movably positioned in the recess 15 and the tubular members 18 which project oppositely therefrom extend through openings 19 formed in the piston and into the tubular extensions 13 of the cylinder heads. The tubular member 18 is disposed eccentric to the axis of the piston 14, and filling within the eccentric extensions 13 prevents rotary movement of the piston within the cylinder. Packing rings 20 are positioned in grooves formed in the tubular members 18 and engage the walls of the openings 19 to prevent leakage of the motive fluid from the ends of the cylinder into the recess 15. Packing rings 21 are also positioned in grooves formed adjacent the ends of the tubular members 18 to prevent the leakage of the motive fluid from the tubular extensions 13.

A shaft 22 is rotatably mounted in the tubular members 18 and is supported at one end in a bearing member 23 carried by one end of the base 5. The shaft 22 is prevented from moving longitudinally with relation to the cylinder by a fly wheel 24 and collar 25, which are fastened to said shaft upon opposite sides of the bearing member 23.

The portion of the shaft 22 which is disposed within the cylinder 6 and tubular extensions 13 is formed with oppositely pitched spiral grooves 26 and 27.

A pair of sleeves 28 and 29 are rotatably mounted in the adjacent ends of the tubular members 18 and the sleeve 28 is formed with internal screw threads fitted in the spiral groove 26 in the shaft 22, while the other sleeve 29 is formed with internal screw threads fitted within the other spiral groove 27.

The adjacent ends of the sleeves 28 and 29 are formed with flanges 30 and 31, in which are formed oppositely directed ratchet teeth. A substantially triangular double-toothed pawl 32 is pivotally secured at 33 in a recess formed in the enlargement or housing 17, and is adapted to alternately engage the ratchet teeth of the flanges 30 and 31, during reciprocation of the piston 14 within the cylinder. By reference to Fig. 1 it will be observed that the housing 17 is movable a limited distance within the recess 15 in the piston and as said housing frictionally engages the wall of the bore of the cylinder it is evident that during reciprocation of the piston the housing will be shifted from one to the other end of the recess 15. The medial portion of the bar or web 16 of the piston is formed with a vertical slot 34, through which is secured a pin 35 received within a slot formed in a vertical extension 36 of the pawl 32, whereby the latter is alternately engaged with the ratchet teeth of the two flanges 30 and 31 during movement of the housing 17 with relation to the piston 14.

The medial portion of the cylinder 6 is formed with diametrically opposed inlet and exhaust ports 37 and 38, respectively.

In operation, the compressed mixture at the left end of the cylinder 6, in Fig. 1, is ignited by the spark plug 12 and the consequent expansion of the mixture effects a longitudinal movement of the piston 14 toward the right hand end of the cylinder, the housing 17 being simultaneously moved against the left hand wall of the recess 15 in the piston, causing the pawl 32 to lock the sleeve 28 against rotation, and thus as the piston moves the sleeve 28 is held against rotation and the screw threads thereof working in the groove 26 in the shaft 22 rotate the latter in the direction of the arrow in Fig. 1. As the piston 14 passes the exhaust port 38 the products of combustion are exhausted therethrough and as the piston approaches the right hand end of the cylinder the mixture in that end is compressed and subsequently ignited by the spark plug 12, the coincident explosion effecting a leftward movement of the piston and causing the housing 17 to be moved against the right hand wall of the recess 15 in the piston 14, thus swinging the pawl 32 upon its pivotal axis 33 and engaging it with the ratchet teeth of the sleeve 29, whereby the latter is locked against rotary movement and the internal screw threads of that sleeve operate to rotate the shaft 22. It will be understood that during the movement of the piston 14 toward the right the sleeve 29 is released from the pawl 32 and may freely rotate, while as the piston moves in the opposite direction the sleeve 28 is released from the pawl 32 and may also freely rotate.

Although I have shown the invention embodied in an engine of the internal combustion type, it will be understood that the principles of construction may be embodied in other engines operated by fluid pressure.

What I claim is:

1. In an engine, a cylinder, a piston reciprocably mounted therein, an engine shaft extending through the piston and disposed eccentrically thereto, and means for transmitting movement of the piston to the shaft.

2. In an engine, a cylinder, a piston reciprocably mounted therein, a tubular member projecting eccentrically from the piston and slidably received in the head of the cylinder, a shaft rotatably supported in the tubular member, and means for transmitting movement of the piston to the shaft.

3. In an engine, a cylinder, a piston reciprocably mounted therein, a shaft having a spiral groove therein, means carried by the piston and engaging in the groove to transmit rotary movement to the shaft during reciprocatory movement of the piston, and means having sliding contact with the wall of the cylinder to automatically shift the piston carried means.

4. An engine including a cylinder, a piston reciprocably mounted therein, a shaft having oppositely pitched spiral grooves therein, internally screw threaded sleeves fitted upon the grooved shaft and movable with the piston whereby rotary movement is imparted to the shaft during reciprocation of the piston, and means contacting the cylinder wall to alternately lock the sleeves against rotation.

5. An engine including a cylinder, a piston reciprocably mounted therein, a shaft having oppositely pitched spiral grooves therein, internally screw threaded sleeves fitted upon said shaft and movable with the piston, means to alternately lock the sleeves against rotation, and means operable by contact with the cylinder wall to automatically actuate the locking means during reciprocation of the piston to effect rotary movement of the shaft in one direction.

6. An engine including a cylinder having tubular extensions connected therewith, a piston reciprocably mounted in said cylinder having a recess therein, a housing movably positioned in said recess and engaging the wall of the bore of the cylinder whereby the position of the housing is shifted with relation to the piston during reciprocation of the latter, tubular members connected with said housing and extending into the extensions, a shaft rotatably supported in said tubular members and having oppositely pitched spiral grooves therein, internally screw threaded sleeves fitting in the grooves of the shaft and rotatably received within the housing, and means controlled by said housing for alternately locking the sleeves against rotary movement to effect rotary movement of the shaft in one direction during reciprocation of the piston.

7. In an engine, a cylinder, tubular extensions projecting outwardly of the opposed ends of the cylinder and disposed eccentrically with relation to the axis of the latter, a piston reciprocably mounted in the cylinder, a shaft mounted in the piston and arranged within the extensions, a tubular member disposed eccentric to the axis of and connected with the piston, extending into the extensions and rotatably receiving the shaft, and means for transmitting movement of the piston to the shaft.

8. In an engine, a cylinder, a piston reciprocably mounted therein, a shaft extending through the piston and cylinder and having oppositely pitched spiral grooves therein, internally screw threaded sleeves fitted in the shaft and movable with the piston, and a single pawl pivotally supported in the piston and capable of alternately locking the sleeves against rotation.

9. An engine including a cylinder, a piston reciprocably mounted therein, a shaft extending through the piston and cylinder and having oppositely pitched spiral grooves therein, internally screw threaded sleeves fitted upon the shaft and movable with the piston, a pawl for alternately locking the sleeves against rotation, and means having sliding contact with the wall of the cylinder for automatically shifting the pawl.

10. An engine including a cylinder, a piston reciprocably mounted therein, a shaft extending through the piston and cylinder, said piston having a diametrical recess, a tubular member engaged with the piston and movable longitudinally with relation thereto, an enlargement on the tubular member having sliding contact with the wall of the cylinder, said shaft having oppositely pitched spiral grooves therein, internally screw threaded sleeves fitted upon said shaft, and means controlled by said enlargement for alternately locking the sleeves against rotation.

In testimony whereof I affix my signature in presence of two witnesses.

AXEL V. RASMUSSEN.

Witnesses:
 EDWIN HERZOG,
 M. J. FEAMLEY.

Copies of this patent may be obtained for five cents each, by addressing the "Commissioner of Patents, Washington, D. C."